United States Patent
Manchala et al.

(10) Patent No.: US 6,405,178 B1
(45) Date of Patent: Jun. 11, 2002

(54) ELECTRONIC COMMERCE ENABLED PURCHASING SYSTEM

(75) Inventors: Daniel W. Manchala, Torrance; Viswanath Yegnanarayanan, Whittier, both of CA (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/467,631

(22) Filed: Dec. 20, 1999

(51) Int. Cl.$^7$ ............................................ G06F 17/60
(52) U.S. Cl. .............................. 705/29; 705/27; 705/28
(58) Field of Search ........................... 705/29, 28, 26, 705/27; 340/541; 700/241

(56) References Cited

U.S. PATENT DOCUMENTS

| | | | | |
|---|---|---|---|---|
| 4,992,940 A | * | 2/1991 | Dworkin ...................... | 235/383 |
| 5,091,713 A | * | 2/1992 | Horne et al. ................. | 340/541 |
| 5,533,079 A | * | 7/1996 | Colburn et al. ............... | 705/28 |
| 5,608,643 A | * | 3/1997 | Witcher et al. ............. | 700/241 |
| 5,638,519 A | * | 6/1997 | Haluska ........................ | 705/28 |
| 5,808,894 A | * | 9/1998 | Wiens et al. ................. | 700/231 |
| 5,893,076 A | * | 4/1999 | Hafner et al. ................. | 705/29 |
| 5,930,771 A | * | 7/1999 | Stapp .......................... | 705/28 |
| 6,188,991 B1 | * | 2/2001 | Rosenweig et al. ........... | 705/29 |
| 6,233,565 B1 | * | 5/2001 | Lewis et al. .................. | 705/26 |
| 6,249,774 B1 | * | 6/2001 | Roden et al. ................. | 705/28 |

FOREIGN PATENT DOCUMENTS

| CA | 2046147 | * | 1/1992 | .................. 705/28 |
|---|---|---|---|---|

OTHER PUBLICATIONS

"Software buyers' guide", Buyers Guide, Purchasing, v118, n8 p59(6), May 1995.*

"Johnson Controls Pioneers Automated Inventory Replenishment Program for Distrubutors,", Newswire, p2161 Sep. 1999.*

Hewlett–Packard: HP introduces the next generation of office–supplies "smart" vending machines, Presswire, Nov. 1999.*

* cited by examiner

*Primary Examiner*—Kenneth R. Rice
*Assistant Examiner*—Lynda Jasmin
(74) *Attorney, Agent, or Firm*—Philip T. Virga

(57) ABSTRACT

A computer system for automatically ordering consumables for a printer or a similar machine where the inventory is monitored by comparing the amount of material delivered, for example, by scanning the incoming cartons, against the amount used, for example, by the machine automatically sending to the computer counts of the various units consumed. The computer is equipped with a set of rules for automatically reordering new supplies. In an alternative case, the rules would request a concession, in terms of price or some other parameter such as quantity, from one or more vendors before ordering.

8 Claims, No Drawings

ELECTRONIC COMMERCE ENABLED PURCHASING SYSTEM

BACKGROUND OF THE INVENTION

Current day printers notify the operator when the printer runs out of paper or toner or any other consumable. The operator is also notified in cases such as when a disk is damaged and needs a possible replacement. Notifications such as these take place after an event has occurred. Moreover, when operating a fleet of printers (a network application services this fleet of printers), there is a need to restock consumables when their availability is near exhaustion. Current day research in electronic commerce tries to address aspects such as automatically placing an electronic purchase order with a vendor when stocks of consumables are near exhaustion. However, there is little research and there are not many inventions that address issues such as providing information regarding changes in prices of consumables, notification of regular maintenance service, negotiating prices of consumables, etc. Currently this is being done either by sending an email to the system administrator or by regular mail. Thus, it is possible for the network application to receive requests from a set of approved vendors using an IP address filtering scheme that rejects all packets from any other vendor. This is one way to prevent spamming. However, it is not possible for the network application to reject messages even from approved vendors for any reason using the IP filtering scheme. Moreover IP address filtering mechanism is subject to IP address spoofing attacks.

Many of the individual steps described herein are explained in more detail in the following Supporting Infrastructure and Reference publications, and are incorporated by reference herein.

Supporting Infrastructure

The above system is built using infrastructures available to support security and electronic commerce.

1. The system makes use of common authentication technologies like SSL[1]/TLS [2] to communicate with vendors while placing orders. The system makes use of secure email methods (like S/MIME)[3], [4] to send or receive email.
2. The system makes use of electronic payment methods (like SET, JEPI) [5] [6] to make a payment for goods ordered using a credit-based system.
3. The system uses electronic commerce technologies like NetBill [7] to make it possible for transactions to take place with payments using on-line banking system.
4. The system maintains a trustable vendor matrix and uses methods such as trust protocols described in [8], [9], [10].
5. The system uses methods described in [11] to provide atomicity in electronic commerce transactions, although it would be unnecessary to do this, since the vendors maintain a certain contract with the customer.
6. The system makes use of inventory management systems like the San Francisco [12] project to support inventory management.
7. The system makes use of glyph technology to automatically receive update and verify information on ordered goods when they arrive at the customer's site.

References

1. [SSLV3] A. O. Freier, P. Karlton, P. Kocher, The SSL Protocol V.3, <draft-freier-ssl-version3–02.txt>, http://home.netscape.com/eng/ssl3/draft302.txt, November 1996.
2. [RFC2246] Dierks T., Allen C., The TLS Protocol Version 1.0,
3. [RFC1847] Galvin J., Murphy S., Crocker S., and Freed N., Security Multiparts for MIME: Multipart/Signed and Multipart/Encrypted, October 1995.
4. [RFC1848] Crocker S., Freed N., Galvin J., and Murphy S., MIME Object Security Services, October 1995.
5. [SET] Secure Electronic Transactions, http://www.mastercard.comset
6. [JEPI] Joint Electronic Payment Initiative, http://www.w3.org/pub/WWW/Payments/white-paper.html
7. B. Cox, M. Sirbu, J. D. Tygar, NetBill Security and Transaction Protocol. Proceedings of the $1^{st}$ USENIX Workshop on Electronic Commerce, pp. 77–88, July 1995.
8. J. Su, D. Manchala, Building Trust for Distributed Commerce Transactions, $17^{th}$ International Conference on Distributed Computing Systems (ICDCS '97), pp. 322–329, Baltimore, May 1997.
9. D. Manchala. Trust Metrics, Models and Protocols for Electronic Commerce Transactions. $18^{th}$ International Conference on Distributed Computing Systems (ICDCS '98), pp. 312–321, Amsterdam, May 1998.
10. J. Su, D. Manchala. Trust Vs. Threats: Recovery and Survival in Electronic Commerce. $19^{th}$ International Conference on Distributed Computing Systems (ICDCS '99), Austin, Tx. May–June 1999.
11. J. Su, D. Tygar, Building Blocks for Atomicity for Electronic Commerce, Proceedings of the $6^{th}$ USENIX Security Symposium, pp. 97–103. San Jose, July 1996.
12. Rubin B S, Christ A R, Bohrer K A, Java and the IBM San Francisco Project, pp. 365–371, Vol. 37, No. 3. 1998.

SUMMARY OF THE INVENTION

This invention describes a method by which a network application engages in a two way conversation with a vendor
  i) by placing a purchase order for a consumable and
  ii) by renewing a contract originating from the vendor or by re-negotiating prices of consumables with a vendor or by obtaining product specific information from the vendor. The network application receives events from the printers and either notifies operators or places an order with the vendor when the stock of a consumable (e.g., paper, toner) runs low.

The main thrust of the invention comes from the fact that the network application can receive an authenticated request for renewal of contract, and to provide for re-negotiation of price. The system administrator can specify the constraints on the price and/or the quantity of consumables that the application can order automatically, and a certain lee-way for an unanticipated change in price. For example, the system administrator can authorize the network application to place a purchase order for a certain quantity of white A4 paper subject to the constraints that the order can be placed at most twice a week and price changes do not occur for a period of six months. In addition, the system administrator gives a lee-way of $5.00 if price change does occur within the six month period.

The network application can also receive information from the vendor on maintenance, and also the availability of new printer options or upgrades. The network application comes under the threat of being spammed by unsolicited information from vendors. Such unsolicited information is of two kinds. Vendors not approved by the recipient (usually system administrator) could send their promotional information. Even approved vendors may send information above and beyond what has been agreed to by the recipient.

In this invention we also present a spam reduction mechanism that uses email filtering techniques. Email filtering procedure starts by defining a format for messages between the vendor and the recipient network application. By examining the incoming messages based on this format, the network application can filter incoming messages, accepting only those categories of messages that have been pre-approved for this vendor. By this scheme, messages from vendor imposters will also be discarded. This is because the decrypted identification information will not match the expected header information for this vendor.

We. are also proposing a policy by which the network application can examine the identification information and either disregard or accept the message.

The strength of the invention comes from the combination of the following systems to form a complete electronic commerce negotiation and purchasing system. Other electronic commerce systems described in the literature address limited areas. For example, NetBill [7] does not address inventory management or email filtering issues. Our system attempts to provide a total solution for electronic commerce that is also tied to inventory management, email filtering and rule based authorization to purchase goods with allowances for price changes. The system affords flexibility by providing customer configurable policies for each subsystem.

1. A system that manages inventory: When goods arrive at the customer a glyph based scanner reads the information on the goods and automatically updates inventory levels. Thus, the entire process is automated without the need for manual intervention to maintain inventory.
2. A system that automatically places a purchase order when a notification about the near exhaustion of a consumable is received from the network application that services a fleet of printers. Before placing an order, the purchasing system consults the inventory management system regarding the availability of the consumable in stock.
3. A system that negotiates the price of consumables. The customer, such as a commercial print shop, is able to maintain a relationship with several vendors as potential suppliers. This list of vendors is configured by the customer. When the price of a certain consumable changes, the negotiation system interacts with a pre-selected list of vendors to obtain the best purchase. The best purchase is determined by the best fit of customer criteria with availability. In most cases, the best purchase will be determined by the best (cheapest) price. But it could also be based on other criteria such as immediate delivery etc. Sometimes, the best price of a consumable might be a little higher than the maximum limit that the system is allowed to purchase. In such cases, the negotiation system determines whether the price changes are within the leeway it has been allowed by the administrator and then makes a decision to place the purchase order.
4. A system that filters email. A commercial print shop has a relationship with several vendors. Some or all of these vendors may be allowed to send updated information on certain products of interest to the print shop electronically. The print shop however is not interested in any other information. To prevent an overload of email (promotional, unsolicited), email filtering techniques are used. The filtering system forwards only the pre-approved type of mail and re-directs or deletes any other mail.

DETAILED DESCRIPTION OF THE INVENTION

The network application consists of an event service, a rule based authorization service, a purchasing service and an authentication service. The system administrator specifies to the network application those consumables and parts that can be handled by our automated solution and those that would still be handled the old fashioned way—manually. Two important aspects of the invention are the following:

1. Non-repudiable order: A network application cannot deny that it has placed an order. This is achieved when the vendor sends the purchase order back to the network application and asks the application to perform a digital signature on it.
2. Non-repudiable receipt: The vendor cannot deny that it has received an order. This is used in circumstances when an order was placed for urgent delivery, but the vendor could not deliver it on time.

The following process takes place:
1. When the printer reaches a predefined threshold of consumable items (e.g. paper or toner) specified by the system administrator or needs to order a replaceable part like a damaged hard disk, it sends an event to the notification service that the particular item needs immediate replacement.
2. The event-notification service consults the authorization service to determine the quantity or cost of replaceable parts that the network application is permitted to order.
3. The event-notification service communicates with the purchasing service, and the purchasing service places an order with the vendor. This order is signed by the purchasing service of the network application. The signature is proof that the network application has placed an order. A credit card purchasing mechanism with SSL or any other payment mechanism like SET could be used.
4. The vendor receives the order. It verifies the signature, and signs the signature of the order and sends it back to the printing system's network application. The network application now has proof that the vendor has indeed received the order. The vendor also sends a copy of the signed order to the system administrator or the purchase manager at the printing systems site. The system admin or the purchase manager can invalidate the purchase order within a specified time. Otherwise, the vendor delivers goods as per the purchase order. The vendor also specifies the expected arrival date of the replacement part, consumable or service person.
5. When a vendor receives an order from the network application, it verifies to see if the consumables are available, or if the price is different from what the application expects. If the consumable is not available or if there is a change in price, the vendor notifies the application about the unavailability or the change in price. The network application may now decide to re-negotiate the rules of the contract. It may order a lower quantity of consumables, agree to buy the same quantity of consumables at the new price based on the lee-way authority provided to it by the system administrator, cancel the order, or ask for a lower price per unit, or some other concession from the vendor. In case of unavailability of a certain consumable the application may decide to place an order with another vendor. The system administrator authorizes the network application to place an order with a different vendor subject to the constraints that the consumable is available with the second vendor at a price+leeway allowed by the system administrator. Placing a new order requires the network application to gather pricing information of consumables or replacement parts from other vendors.

6. When goods arrive at the customer a glyph based scanner reads the information on the goods and automatically updates inventory levels. Thus, the entire process is automated without the need for manual intervention to maintain inventory.

7. The vendor can also send to the network application information such as the availability of new software (e.g: PDLs, etc), hardware addons/options, changes in the price and availability of consumables etc, by e-mail.

8. Since a firewall doesn't prevent spamming by email to the network application, the vendor is required to preface the information message with a randomly generated identification number previously agreed to between the two parties. Alternatively, the vendor's IP address can serve as its identification number. This number and other identification information is encrypted using its (the vendor's) private key to obtain a digital signature. On receipt of the message the network application decrypts the preface using the corresponding public key of the vendor. When the network application recognizes the identification number, it will accept the message from the vendor. All others messages are disregarded. This will prevent spamming.

9. After the message is accepted by the network application, a received receipt is sent to the vendor if necessary. This is to prevent the network application from saying that it never received an update. For example, this may be necessary in case of a price change.

Policy: pertaining to steps 7 and 8, a policy by which the network application can examine the identification information and either disregard or accept the message. (between network application and vendor): The network application may accept or decline the message received from a particular vendor. Some possible policies are:

1. One category per message: The network application can decide to decline any messages that contain two or more categories. For example, a vendor cannot send a price change along with other sales or marketing information.
2. Drop the entire message when at least one category is unacceptable: If the network application decides to accept a message irrespective of the number of categories it contains, it may establish a policy that if it does not understand or accept at least one category, it drops the entire message and sends a message to the sender (vendor) of its unacceptance.
3. Accept all valid messages. Ignore rest.
4. Accept all valid categories. Warn sender on rest.

We now illustrate a category, in this case a change in price (CP), with an example below.
Header: CP-X12-0092
Where,
 CP: Change in price, X12: Vendor id, 0092:serial message number from the vendor
 Similar categories could be
 AO: Availability of options
 SB: Sales Brochure
 M: Maintenance Reminder
Rules:
All rules have the following format.
If <condition | possibility >then <action>with probability <0 . . . 1>

These rules are implemented using a rule based expert system or a fuzzy logic based expert system. The action part of these rules are implemented as procedures in a high level language like Java, C or C++.

Here are a few examples of rules required for the electronic commerce purchasing system. These rules are initially entered by a system administrator. These rules are formed from current printer usage and projected demand information.

L Rules for Toner.
 1. If a printer toner is low then check inventory.
 2. If toner inventory is low then place purchase order.
 3. If toner inventory is low then place purchase order.

II. Rules for paper.
 If a printer paper level is low then check inventory
 If paper inventory is low the n place a purchase order.
 If paper inventory is high then notify operator to replace paper in printer (with probability 0.9).
 If current demand is high and inventory paper level is low then place a purchase order (with probability 0.75).

III. Rules for Leeway.
 If a contract exists with a vendor A and the price of consumable has changed with A then check leeway.
 If leeway is small then place a purchase order.
 If price change is slightly more than acceptable leeway and inventory level is not low and current demand is low then call for quotes from other vendors.

IV. Rules for Negotiation.
 If Vendor B quote is less than Vendor A and contract exists with Vendor A then negotiate price with Vendor A for a concession.

The terms low, high, more, small and not are possibility values. These have to be defined in terms of a range of numeric values by the system administrator. For example, toner inventory is low could imply that toner levels in the inventory are between 2 and 5 reams for full stock of 30 reams.

The current demand is calculated from an estimated size of each print job in the queue and the number of copies of the unit job. Projected demand is calculated from prior experience. For example, there is usually low volume of print jobs in holiday season, and a high volume when schools reopen.

While the invention has been described with reference to a specific embodiment, it will be understood by those skilled in the art that various changes may be made and equivalents may be substituted for elements thereof without departing from the true spirit and scope of the invention. In addition, many modifications may be made without departing from the essential teachings of the invention.

What is claimed is:

1. A method for using an automatic system for tracking and ordering units comprising the:
 A. a method of tracking an inventory of a current number of units comprising the steps of:
  (1) adding a first number of units received from a vendor to the current number of units, and
  (2) in response to a signal, subtracting a second number from the current number, and
 B. the method of ordering additional units when the current number is at or below a predetermined threshold comprising the steps of:
  (1) assembling a list of parameters for one or more quantities of units for one or more vendors, the parameters being price, quality, delivery schedule or quantity,
  (2) using a set of rules programmed into an expert system with fuzzy rules for determining a selection based on information given by vendors without user intervention on an ordering site, and (3) ordering the selection, and C. the method wherein cryptographic methods of digital signature techniques are used to provide:
(1) the vendor with proof of order from an ordering computer, and
(2) receiving proof of receipt of the order from the vendor, and D. the method wherein automatic electronic payment for goods ordered upon receipt of goods, and E. the method wherein newer upgrades or products are advertised by the vendor using cryptographic means to:
(1) filter unsolicited messages from known vendors, and
(2) filter unwanted message from unknown vendors.

2. The system of claim 1 wherein each vendor is allowed to change a parameter in the list.

3. The system of claim 1 wherein the unit is a consumable.

4. The system of claim 1 wherein the automatic system, ordering computer and vendor communicate by a network.

5. The system of claim 4 wherein the ordering computer could include a cluster of ordering computers.

6. The system of claim 1 wherein the vendor receives proof of the order from the ordering computer and the ordering computer receives proof of the receipt of the order from the vendor.

7. The system of claim 1 wherein electronic filtering is used to allow only a change in a parameter from a selected vendor by having a message conform to a predetermined format.

8. An automatic system for tracking and ordering units comprising the steps of:

A. a method of tracking an inventory of a current number of units comprising the steps of:
(1) adding a first number of units received from a vendor to the current number of units, and
(2) in response to a signal, subtracting a second number from the current number, and B. the method of ordering additional units when the current number is at or below a predetermined threshold comprising the steps of:
(1) assembling a list of parameters for one or more quantities of units for one or more vendors, the parameters being price, quality, delivery schedule or quantity,
(2) using a set of rules programmed into an expert system with fuzzy rules for determining a selection based on information given by vendors without user intervention on an ordering site, and
(3) ordering the selection, and C. the method wherein cryptographic methods of digital signature techniques are used to provide:
(1) the vendor with proof of order from an ordering computer, and
(2) receiving proof of receipt of the order from the vendor, and D. the method wherein automatic electronic payment for goods ordered upon receipt of goods.

* * * * *